No. 847,395. PATENTED MAR. 19, 1907.
E. BÖHM.
LIGHT TRANSMITTING AND LIGHT DIFFUSING OBJECT.
APPLICATION FILED APR. 30, 1906.
FIG. 1.
FIG. 2.
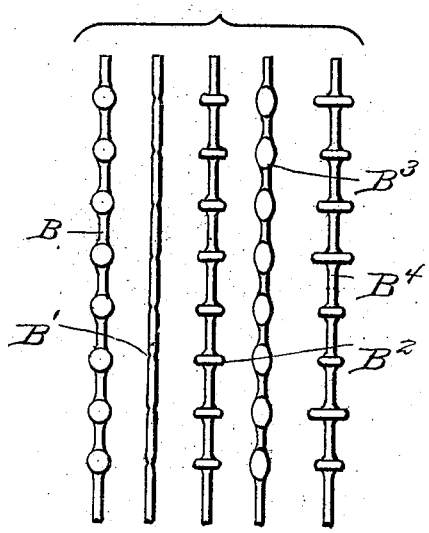
FIG. 3.
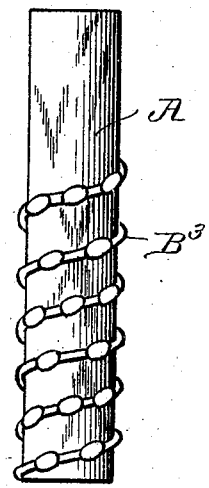
FIG. 4.
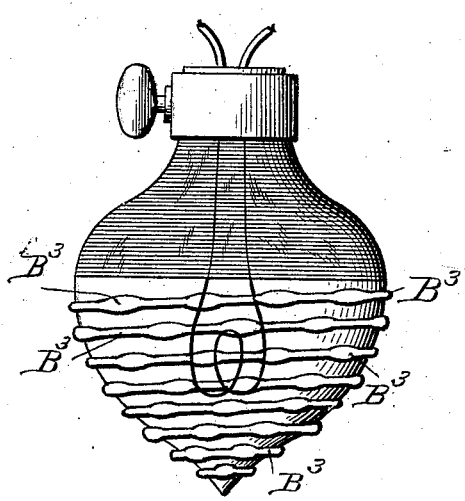
FIG. 5.
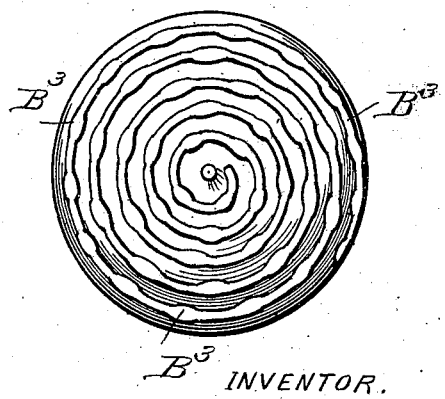
WITNESSES
Harry L. Amer.
E. E. Storm.
INVENTOR.
Ernest Böhm
By E. M. Marble
his Attorney

UNITED STATES PATENT OFFICE.

ERNEST BÖHM, OF LONDON, ENGLAND.

LIGHT-TRANSMITTING AND LIGHT-DIFFUSING OBJECT.

No. 847,395.　　　Specification of Letters Patent.　　Patented March 19, 1907.

Application filed April 30, 1906. Serial No. 314,384.

*To all whom it may concern:*

Be it known that I, ERNEST BÖHM, a subject of the King of Great Britain, and residing at London, England, have invented new and useful Improvements in Light-Transmitting and Light-Diffusing Objects, of which the following is a specification.

My invention relates to light-transmitting and light-diffusing objects—such, for example, as incandescent electric lamps—and consists in the construction and arrangement of the parts, which will be fully described in the specification, illustrated in the drawings, and particularly pointed out in the claim.

The object of my invention is to provide light-transmitting and light-diffusing articles—such as incandescent lamps, for example—with a plurality and multiplicity of individual and independent lenses formed integral with the walls of the globe or bulb for the purpose of improving the illumination and the diffusion of the light produced therein.

For the purpose of illustration I will describe my invention with particular reference to the production of incandescent-electric-lamp bulbs; but it will be understood that other light-transmitting or light-diffusing objects may be formed similarly.

In the accompanying drawings, forming a part of this application, and in which like letters refer to corresponding parts, I have shown the parts with which I carry out my process and the product I obtain.

Figure 1 represents a side elevation of an ordinary glass tube from which smooth or common globes or bulbs are formed or blown. Fig. 2 represents small rods having bosses or swellings therein, round, oval, or oblong, throughout its entire length. Fig. 3 represents a glass tube with a rod having bosses, swellings, or oblong sections wound around the said glass tube. Fig. 4 represents a side view of a globe or bulb made in accordance with my process, showing a plurality and multiplicity of lenses and provided with means for use singly or in series in an electric circuit. Fig. 5 represents a bottom plan view of the globe or bulb manufactured by my process, showing in convolute lines a plurality and multiplicity of lenses on the same.

In making my lamp, I take a glass tube A, preferably partly opal or colored, of the size and length usually employed in forming or blowing glass bulbs or globes for lamps and wind spirally around, either inside or outside, rod or thread B, provided with notches, bosses, or swellings, round, oval, or oblong, said rod or thread B having been heated to a sufficient degree to render it pliable and easily bent, as shown in Fig. 3. The tube and rod thus wound are then heated to the required degree for blowing and are blown to any desired size. During the blowing operation the spirally-wound glass rod, with its bosses and swellings, is incorporated and blended with the tube and becomes an integral part thereof, making an irregularly-corrugated surface, with a multitude of independent lenses formed in the globe by the breaking up and crossing of the surfaces of the tube and rod. These lenses will disseminate independent and distinct rays of light, and thus the light radiated from the globe is increased, diffused more perfectly than by ordinary lamps, and also the incandescing filament is hidden, and so does not dazzle the eyes.

I may employ my invention with plain tubes of glass or with tubes partly made of opal or colored glass.

I may use any of the various forms of rods B B' B², &c., (shown in Fig. 2,) in the manner above described, using one or another, according to whichever is best adapted for the particular effect desired.

Having thus fully described my invention, what I claim, and desire to secure by Letters Patent, is—

As an article of manufacture, a lighting-globe consisting of a hollow body of transparent material having on its surface an integral rib comprising numerous bulbous irregularities on its outer surface which form separate lenses.

In testimony whereof I affix my signature in presence of two subscribing witnesses.

ERNEST BÖHM.

Witnesses:
　A. D. JAMESON,
　A. NUTTING.